(12) United States Patent
Nitschke et al.

(10) Patent No.: US 6,566,765 B1
(45) Date of Patent: May 20, 2003

(54) METHOD FOR OPERATING A RESTRAINT SYSTEM CONNECTED TO A BUS LINE DURING FAULTY POWER SUPPLY

(75) Inventors: Werner Nitschke, Ditzingen (DE);
Otto Karl, Leonberg (DE); Joachim Bauer, Oberstenfeld-Prevorst (DE);
Michael Bischoff, Adelschlag (DE);
Günter Fendt, Schrobenhausen (DE);
Johannes Rinkens, Ingolstadt (DE);
Stefan Schäffer, Schrobenhausen (DE);
Norbert Mueller, Schrobenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/647,291
(22) PCT Filed: Mar. 19, 1999
(86) PCT No.: PCT/DE99/00778
§ 371 (c)(1), (2), (4) Date: Dec. 19, 2000
(87) PCT Pub. No.: WO99/50101
PCT Pub. Date: Oct. 7, 1999

(30) Foreign Application Priority Data

Mar. 28, 1998 (DE) .......................................... 198 13 921

(51) Int. Cl.$^7$ ............................................... B60R 21/00
(52) U.S. Cl. ........................ 307/10.1; 307/64; 180/268; 280/728.1
(58) Field of Search ................................. 307/9.1, 10.1, 307/64; 180/268, 270, 271; 280/728.1, 734, 735

(56) References Cited

U.S. PATENT DOCUMENTS

| 5,015,870 A | * | 5/1991 | Drobny et al. ................. 307/66 |
| 5,216,284 A | * | 6/1993 | Mattes et al. ............... 307/10.1 |
| 5,357,518 A | * | 10/1994 | Peter ............................... 714/4 |
| 5,465,010 A | * | 11/1995 | Rimmer ....................... 307/9.1 |
| 5,534,848 A | * | 7/1996 | Steele et al. ................. 280/735 |
| 5,638,295 A | * | 6/1997 | Lagree et al. .................. 307/64 |
| 5,675,189 A | * | 10/1997 | Anma et al. .................. 307/9.1 |
| 5,818,673 A | * | 10/1998 | Matsumaru et al. ........ 307/10.1 |
| 5,831,346 A | * | 11/1998 | Baumann et al. .............. 307/64 |
| 5,835,873 A | * | 11/1998 | Darby et al. ................... 701/45 |
| 5,964,815 A | * | 10/1999 | Wallace et al. ................ 701/45 |
| 6,046,511 A | * | 4/2000 | Kincaid ...................... 307/10.1 |
| 6,052,635 A | * | 4/2000 | Swart et al. ................... 701/45 |
| 6,070,114 A | * | 5/2000 | Fendt et al. ................... 701/45 |
| 6,115,831 A | * | 9/2000 | Hanf et al. ..................... 714/43 |
| 6,209,674 B1 | * | 4/2001 | Buhring ...................... 307/10.1 |
| 6,212,457 B1 | * | 4/2001 | Miciuda et al. ................ 701/45 |
| 6,288,636 B1 | * | 9/2001 | Kaupp et al. .............. 307/10.1 |
| 6,448,671 B1 | * | 9/2002 | Wallace et al. ............. 307/10.1 |
| 6,449,544 B1 | * | 9/2002 | Nitschke et al. .............. 701/45 |
| 6,449,545 B1 | * | 9/2002 | Nitschke et al. .............. 701/45 |
| 6,465,908 B1 | * | 10/2002 | Karuppana et al. ........ 307/10.1 |
| 6,476,515 B1 | * | 11/2002 | Yamamoto et al. ........ 307/10.1 |

FOREIGN PATENT DOCUMENTS

| DE | 195 19 130 | | 12/1996 | |
| DE | 196 09 076 | | 8/1997 | |
| JP | 07-191917 | * | 7/1995 | ........... G06F/13/00 |

* cited by examiner

Primary Examiner—Brian Sircus
Assistant Examiner—Roberto J. Rios
(74) Attorney, Agent, or Firm—Kenyon & Kenyon

(57) ABSTRACT

The restraint system is composed of a central control unit, which is connected via a bus line to a plurality of data processing units each of which is intended to drive one or more restraint devices. To keep the restraint system operational if the power supply in the central control unit becomes defective, a changeover to the vehicle battery voltage as the new supply voltage is effected in the central control unit. The central control unit then signals the changeover to the new supply voltage to all the data processing units. All the data processing units thereupon adjust their circuits to the new supply-voltage level.

3 Claims, 3 Drawing Sheets

METHOD FOR OPERATING A RESTRAINT SYSTEM CONNECTED TO A BUS LINE DURING FAULTY POWER SUPPLY

FIELD OF THE INVENTION

The present invention concerns a method for operating a restraint system networked via a bus line in conjunction with a defective power supply, in which a central control unit and a plurality of data processing units are connected to the bus line, each of the data processing units being intended to drive one or more restraint devices, and the power for the data processing units being supplied from the central control unit.

BACKGROUND INFORMATION

The capabilities of vehicle restraint systems will increase substantially in the future in order to afford passengers still greater protection. This means that there will be a tremendous increase in the number of restraint devices and associated triggering means installed in vehicles. Examples of such restraint devices are driver and front-passenger airbags, which can optionally be activated in multiple stages, driver and front-passenger knee bags, side airbags for the driver and the front-seat and back-seat passengers, such side airbags optionally being provided for both the head and chest areas, seat-belt pretensioners, which also can be activated in multiple stages, optionally also roll bars, etc. A complex protection system composed of multiple restraint devices for each passenger will thus be installed in vehicles.

In the *Conference Proceedings of the SAE International Congress & Exposition*, Feb. 24–27, 1997, Detroit, a complex restraint system is described in the paper "Bus System for Networking Actuators for Restraint Systems," by J. Bauer, G. Mehler and W. Nitschke. By introducing a bus system that networks all the restraint devices to one other, the authors were able to eliminate the need for bulky cable harnesses. In this known system each restraint device has its own data processing unit, basically composed of a processor, data input and output circuits, a memory unit, a time and clock base and a power supply. This data processing unit, also referred to as a peripheral intelligent firing stage, is located in the immediate vicinity of the triggering means for the restraint device concerned, i.e., in a squib connector or on a substrate of the squib itself.

Each data processing unit receives its power from a central control unit via a bus line. The central control unit further determines which restraint devices are to be triggered, basing its decision on multiple sensor signals, for example from acceleration sensors, pre-crash sensors, seat occupancy sensors. To accomplish this, the central control unit addresses the data processing units concerned by means of a protocol transmitted via the bus line. Diagnostic test requests also go out from the central control unit via the bus line to the individual data processing units, which in turn send their diagnostic test responses back to the central control unit via the bus.

One essential requirement for a vehicle restraint system is that it remain operational to the greatest possible extent, even when circuit defects occur in the central control unit or the data processing equipment. Such a defect would be, for example, failure or defective operation of the power supply in the central control unit. An object of the present invention is, therefore, to advance a method by which the restraint system can be kept operational for potential triggering even when the power supply is defective.

SUMMARY OF THE INVENTION

This object is achieved in that if a defect occurs in the power supply present in the central control unit itself, a changeover is effected to the vehicle battery voltage as the new supply voltage, the central control unit then signals the changeover to the new supply voltage to all the data processing units via the bus line, and the data processing units thereupon adjust their circuits to the new supply-voltage level. These measures ensure that all the restraint devices in the vehicle can still be triggered reliably even if the restraint system's own power supply should fail.

A comparator present in each data processing unit and designed to detect a short circuit on the bus line is switched over to a reference voltage that corresponds to the new supply voltage.

Once the data processing units have adjusted to the new supply voltage, the central control unit sends the data processing units no further information signals or control signals other than trigger commands. This ensures that trigger commands from the central control unit will be able to reach the restraint devices unimpeded.

DETAILED DESCRIPTION

Figure 1:
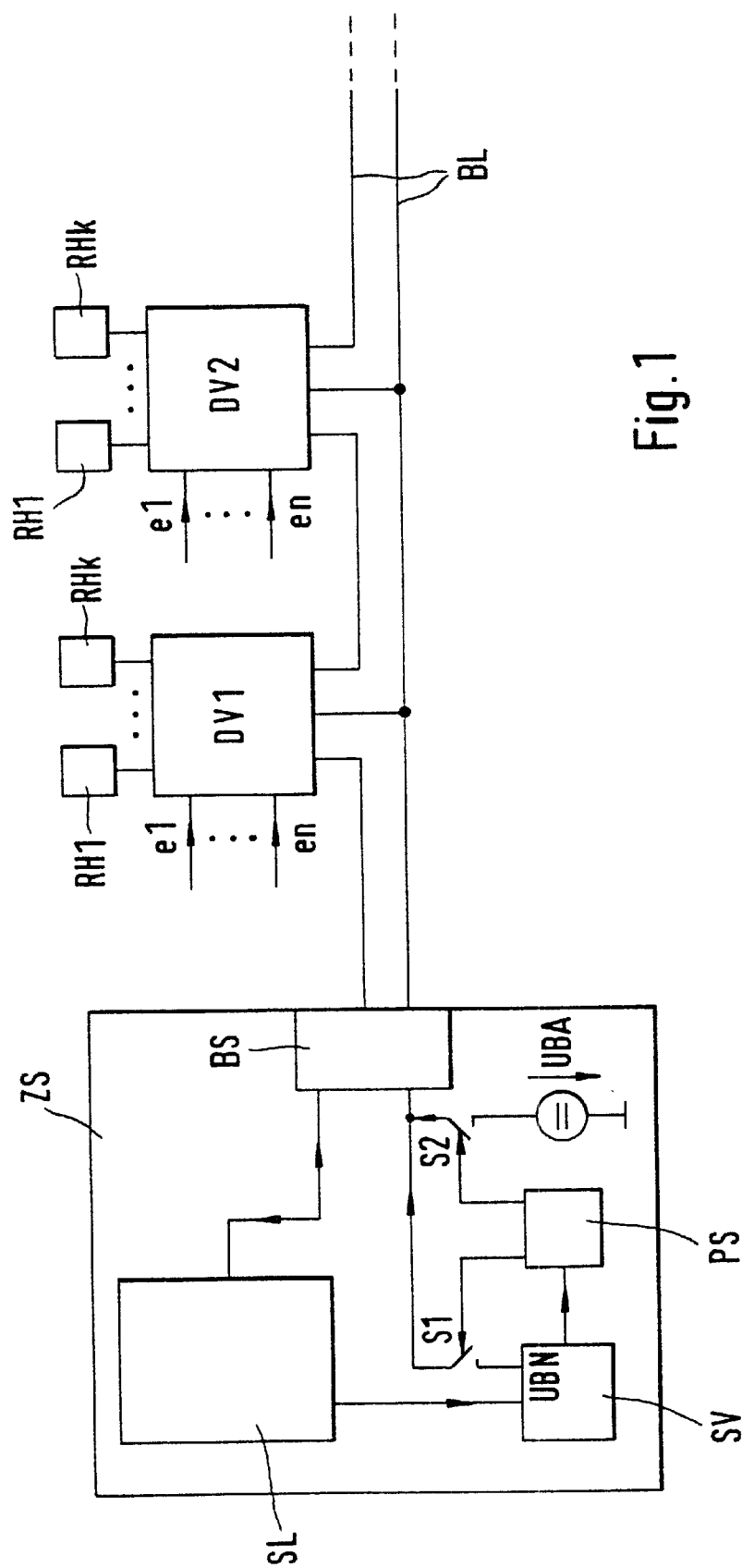
FIG. 1 is a block diagram of a restraint system.

The restraint system depicted in FIG. 1 is composed of a central control unit ZS, to which a plurality of data processing units DV1, DV2 is connected via a bus line BL. Each of the two data processing units DV1 and DV2 shown by way of example in FIG. 1 serves to control one or more restraint devices RH1, . . . , RHk. As enumerated in the introduction, associated with these restraint devices RH1, . . . , RHk are one or more driver and passenger airbags, knee bags, side airbags, seat-belt pretensioners, etc., that can be fired in multiple stages. In the embodiment of the data processing units DV1, DV2 explained in further detail in connection with FIG. 2, in addition to the inputs for the bus line BL, additional inputs e1, . . . , en are provided for further input signals, e.g. sensor signals.

In the exemplary embodiment shown, bus line BL is in the form of a stub line; however, it can also be realized as a ring line.

Central control unit ZS basically comprises a control logic circuit SL, a power supply SV and a bus interface BS, which contains, for example, signal drivers for the information signals and control signals to be transmitted on bus line BL. Also present in central control unit ZS is a test circuit PS that checks the functionality of power supply SV. The test circuit PS, which, for example, can also be integrated into power supply SV or control logic circuit SL, in the event of an error in power supply SV disconnects the supply voltage thereof UBN via a switch S1 and connects in its place the vehicle battery voltage UBA, as the new supply voltage, via a switch S2.

All the data processing units DV1, DV2 have the same circuit design. One data processing unit DV is therefore described in detail with reference to FIG. 2 as representative of all data processing units. To the data processing unit DV is connected a plurality of restraint devices RH1, . . . , RHk. This set of k restraint devices RH1, . . . , RHk is preferably assigned to one passenger. If this is the front-seat passenger, for example, restraint devices RH1, . . . , RHk might include a front airbag, one or two side airbags in the head and chest area, a knee bag and a seat-belt pretensioner, all of the airbags and the seat-belt pretensioner also optionally being capable of multi-stage activation. In the event of a crash, data processing unit DV generates a trigger signal a1, . . . , ak for each of these restraint devices RH1, . . . , RHk, the choice of the restraint devices to be triggered and the triggering instant being made on the basis of multiple input signals e1, . . . , en. The input signals e1, . . . , en are produced by sensors which detect the kinetic behavior of the vehicle in a crash and which can include one or more acceleration sensors, pre-crash sensors, buckle sensors and seat occupancy sensors. From the seat occupancy sensors, data processing unit DV deduces whether the front passenger seat is in fact occupied, whether a child or an adult is sitting there, and even the passenger's sitting posture, so that only those restraint devices are triggered that can actually offer the person protection and will not injure him or her instead. Similarly, the triggering of the restraint devices is suppressed completely if the front passenger seat is not occupied at all or if a child safety seat or a piece of luggage is in it.

Figure 2:
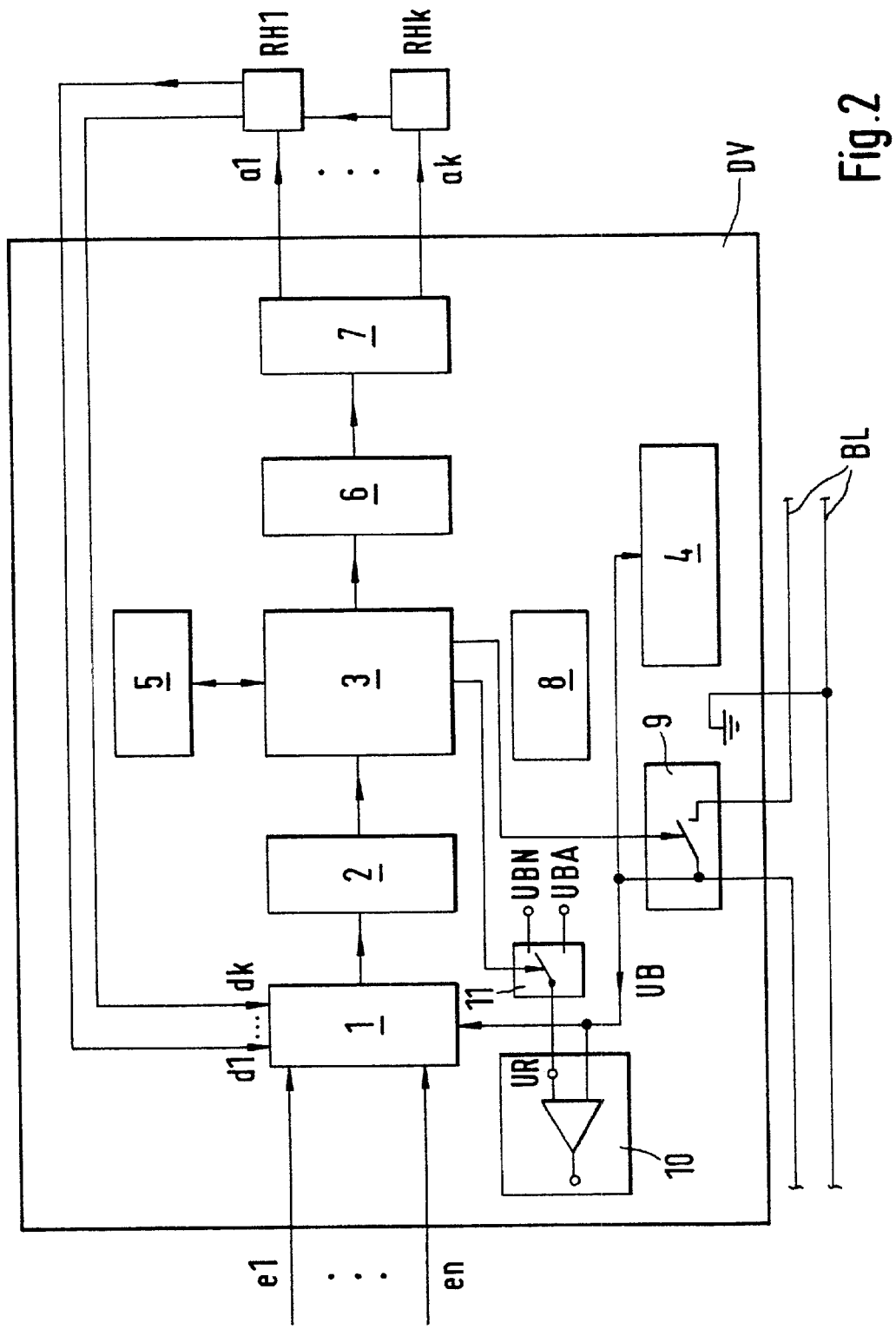
FIG. 2 is a block diagram of a data processing unit.

In FIG. 2, the individual functional elements within data processing unit DV are indicated in block form. There is a signal input circuit 1 for receiving analog or digital input signals e1, . . . , en, comprising, for example, signal drivers and optionally a multiplexer for converting input signals applied in parallel into a serial data stream. The subsequent data preparation circuit 2 can perform analog-to-digital conversion of analog input signals; in any case, here the data are prepared so that they can be processed further digitally in a subsequent processor 3.

The processor 3 performs all the control functions in data processing unit DV. For example, it determines from input signals e1, . . . , en which of the connected restraint devices RH1, RHk should be triggered at which times. It also performs a diagnostic check of the firing elements in restraint devices RH1, . . . , RHk. For this purpose, diagnostic signals d1, . . . , dk—which are, for example, the resistance values of the firing elements, are delivered to signal input circuit 1. Processor 3 compares diagnostic signals d1, . . . , dk to reference values and outputs an error signal if any impermissible differences are present. A diagnostic check is also performed on an energy reserve contained in a power pack 4.

A memory unit 5 serves to log temporary data, such as, for example, the resistance of firing elements and the energy status of the energy reserve, etc., and production-specific and identifying data can also be stored in memory unit 5. The processor 3 can access the data in memory unit 5 and write new data thereinto.

As on the input side of data processing unit DV, processor 3 is followed on the output side by a data conditioning circuit 6 and a signal output circuit 7. In the data conditioning circuit 6, for example the digital triggering data or diagnostic inquiry signals from processor 3 are converted into firing currents or test currents for the firing elements of restraint devices RH1, . . . , RHk. Signal output circuit 7 is equipped with signal drivers and optionally a demultiplexer, which separates a data stream of serial output signals into the individual parallel output signals a1, . . . , ak. A time and clock base 8 present in data processing unit DV supplies a uniform, synchronous clock pulse to all the functional blocks.

Naturally, the distribution of the functional blocks shown in FIG. 2 is not mandatory. For example, signal input circuit 1 and data conditioning circuit 2, or signal output circuit 3 and data conditioning circuit 7, can be combined with each other and can also be partially integrated into processor 3. Likewise, power supply 4 and/or time and clock base 8 can be integrated into data conditioning circuits 2, 6. There are many ways in which multiple functions can be combined in one circuit block.

The data processing unit DV described is a firing stage with a relatively high degree of intelligence, since it can utilize input signals e1, . . . , en to decide autonomously—i.e., independently of control signals from central control unit ZS—whether to trigger restraint devices RH1, . . . , RHk. However, the data processing units need not have an autonomous decision-making function in order to implement the idea according to the invention. All triggering decisions and diagnostic requests can just as well be made by the central control unit ZS and passed on to the data processing units DV.

Each data processing unit DV has an axial switch 9 that can connect or disconnect bus line BL. The axial switch 9 is controlled by processor 3. A request to close or open axial switch 9 can be transmitted from central control unit ZS via bus line BL. It is thereby possible to address individual data processing units specifically on bus line BL and supply them with data or control signals.

Axial switch 9 taps the bus voltage UB to deliver it to power supply 4 and to signal input circuit 1. Power supply 4 derives from bus voltage UB the proportion of energy needed to charge an energy reserve.

Data processing unit DV also includes a comparator circuit 10 whose inputs are at the bus voltage UB and at a reference voltage UR. Reference voltage UR corresponds to the normal supply voltage UBN delivered by power supply SV when the restraint system is operating faultlessly, in particular when power supply SV of central control unit ZS is operating faultlessly and there are no short circuits on bus line BL. Correspondingly, a switch 11 controlled by processor 3 connects the input of comparator circuit 10 for the reference voltage UR to a contact whose potential corresponds to the normal supply voltages UBN. A second contact of switch 11 is at a potential that corresponds to the vehicle battery voltage UBA. Both potentials UBN and UBA are provided by power supply 4 and can be shaped, for example, via a voltage divider. Comparing the bus voltage UB to the normal supply voltage UBN in comparator 10 makes it possible to detect a short circuit on bus line BL. In addition, in the same or an additional comparator circuit 10, the bus voltage UB can be compared to the normal supply voltage UBN, as a reference voltage UR, to distinguish whether central control unit ZS has sent data processing unit DV a triggering signal or some other control signal that has been transmitted at a different signal level.

Figure 3:
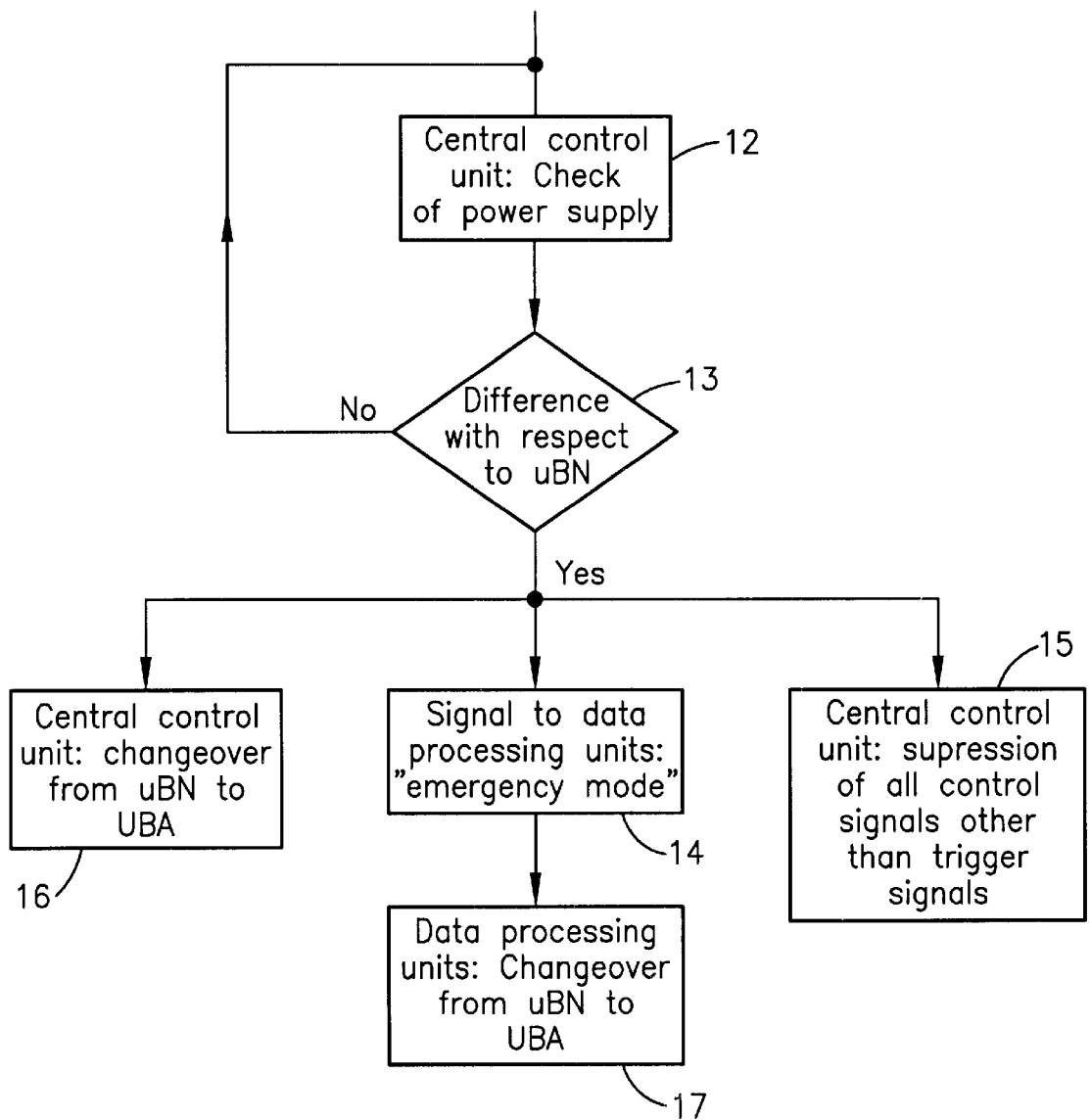
FIG. 3 is a flow chart for the method according to the present invention.

With reference to FIG. 3, there follows a description of the process that takes place in the central control unit ZS and the data processing units DV to keep the restraint system operational in an emergency mode when there is a malfunction in the power supply.

As indicated by block 12, power supply SV in central control unit ZS is checked in central control unit ZS by means of the aforesaid test circuit PS. This can be done by a mere voltage comparison in which the supply voltage UBN currently being provided by power supply SV is compared to a voltage standard. If, as indicated by block 13, no difference from the prescribed normal supply voltage UBN is found, which signifies faultless operation of power supply SV, the restraint system is kept in normal operating mode. However, if the supply voltage provided by the power supply SV differs from the normal supply voltage UBN, then the following process, controlled by the control logic circuit, is set in motion:

Central control unit ZS transmits an information signal that signals emergency mode to all the data processing units DV on bus line BL (see block 14). Per block 15, central control unit ZS then suppresses all control signals (e.g. diagnostic test requests) and allows only trigger signals to be transmitted to the data processing devices.

During or before central control unit ZS transmits its information signal concerning emergency mode, the two switches S1 and S2 effect the changeover from the normal supply voltage UBN to the vehicle battery voltage UBA.

Once the data processing units have received the information concerning emergency mode, the reference voltage UR for comparator circuit 10 is changed over in each data processing unit, controlled by the computer 3, by switch 11 from the normal supply voltage UBN to the battery voltage UBA. The normal supply voltage UBN is, for example, 27 V and the battery voltage UBA 12 V. When all the appropriate circuits, substituting for comparator circuit 10, in the data processing units DV are adjusted to the new supply-voltage level UBA, the restraint system is fully ready for activation.

What is claimed is:

1. A method for operating a restraint system networked via a bus line in conjunction with a defective power supply, a central control unit and a plurality of data processing units being connected to the bus line, each of the data processing units driving at least one restraint device, the central control unit supplying power for the data processing units, the method comprising the steps of:

if a defect occurs in a power supply present in the central control unit itself, effecting a changeover to a vehicle battery voltage as a new supply voltage;

signaling the changeover by the central control unit to all of the data processing units on the bus line; and thereupon adjusting, by the data processing units, circuits associated with the data processing units to a level of the new supply voltage.

2. The method according to claim 1, further comprising the step of switching over a comparator, present in each of the data processing units and designed to detect a short circuit on the bus line, to a reference voltage that corresponds to the new supply voltage.

3. The method according to claim 1, further comprising the step of, once the data processing units have adjusted to the new supply voltage, sending the data processing units no further information signals or control signals from the central control unit other than trigger commands for the restraint devices.

* * * * *